(12) United States Patent
Queau et al.

(10) Patent No.: US 8,146,952 B2
(45) Date of Patent: Apr. 3, 2012

(54) CRYOGENIC GIMBAL COUPLING

(75) Inventors: Jean-Pierre Queau, Nice (FR); Jack Pollack, Houston, TX (US); Philippe Albert Christian Menardo, Nice (FR)

(73) Assignee: Single Buoy Moorings Inc., Marly (CH)

( * ) Notice: Subject to any disclaimer, the term of this patent is extended or adjusted under 35 U.S.C. 154(b) by 205 days.

(21) Appl. No.: 12/161,596

(22) PCT Filed: Jan. 18, 2007

(86) PCT No.: PCT/EP2007/050474
§ 371 (c)(1),
(2), (4) Date: Aug. 12, 2008

(87) PCT Pub. No.: WO2007/082905
PCT Pub. Date: Jul. 26, 2007

(65) Prior Publication Data
US 2009/0026759 A1    Jan. 29, 2009

(30) Foreign Application Priority Data

Jan. 19, 2006 (EP) ..................................... 06100598

(51) Int. Cl.
*F16L 27/10* (2006.01)
(52) U.S. Cl. ........................................ 285/223; 285/904
(58) Field of Classification Search ................... 285/223, 285/904, 47, 53, 148.28, 235, 238, 239, 142.1, 285/137.11, 123.5, 123.8
See application file for complete search history.

(56) References Cited

U.S. PATENT DOCUMENTS

| 130,786 | A | * | 8/1872 | Belt ............................. 235/94 R |
| 428,186 | A | * | 5/1890 | Vering .......................... 285/301 |
| 1,170,920 | A | * | 2/1916 | McCarthy ...................... 174/178 |
| 2,196,676 | A | | 4/1940 | Johnson et al. |
| 2,732,227 | A | * | 1/1956 | Kaiser ............................. 285/47 |
| 3,865,145 | A | * | 2/1975 | McKay et al. ................. 138/113 |
| 4,097,072 | A | | 6/1978 | van Heijst et al. |
| 4,790,446 | A | * | 12/1988 | Thiltgen ....................... 220/219 |

* cited by examiner

*Primary Examiner* — Aaron Dunwoody
(74) *Attorney, Agent, or Firm* — Young & Thompson

(57) ABSTRACT

Coupling structure includes:
a first and a second pipe section each having a metal wall and a flexible pipe section interconnecting the first and second sections,
a hinging support frame including
a first set of arms connected to the first pipe section,
a support ring around the flexible pipe section hingingly attached to the first set of arms, the first set of arms being pivotable around a first axis, and
a second set of arms connected to the second pipe section and hingingly attached to the support ring, the second set of arms being pivotable around a second axis transverse to the first axis,
the base ends of the first and second set of arms are connected to the first and second pipe sections via at least one connector member extending transversely to the respective pipe section, at a predetermined distance from the pipe section metal wall, the arms extending along the respective pipe sections over a predetermined length such that a gap between the pipe section metal wall and the arm is defined over the length.

7 Claims, 7 Drawing Sheets

Figure 1:
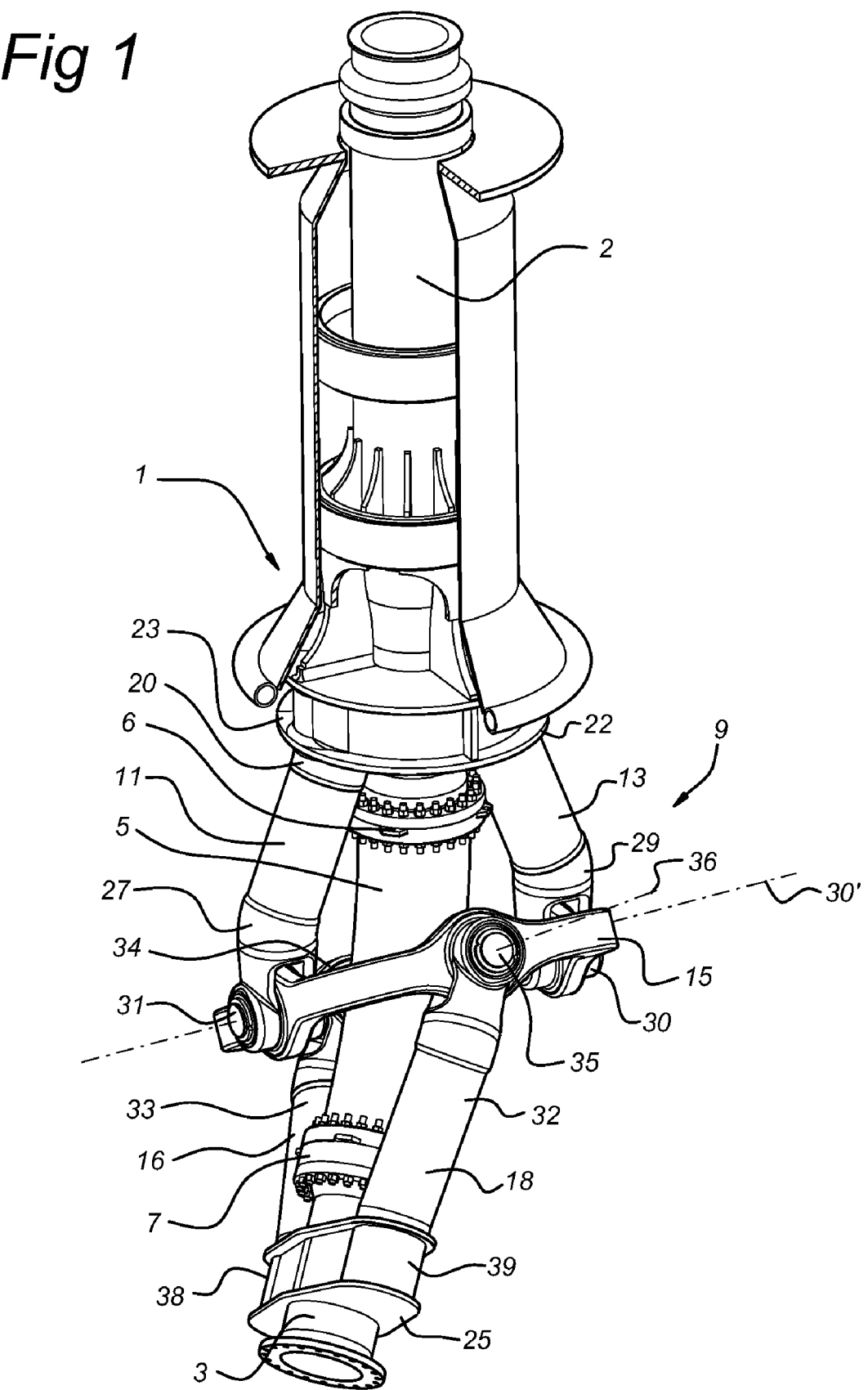

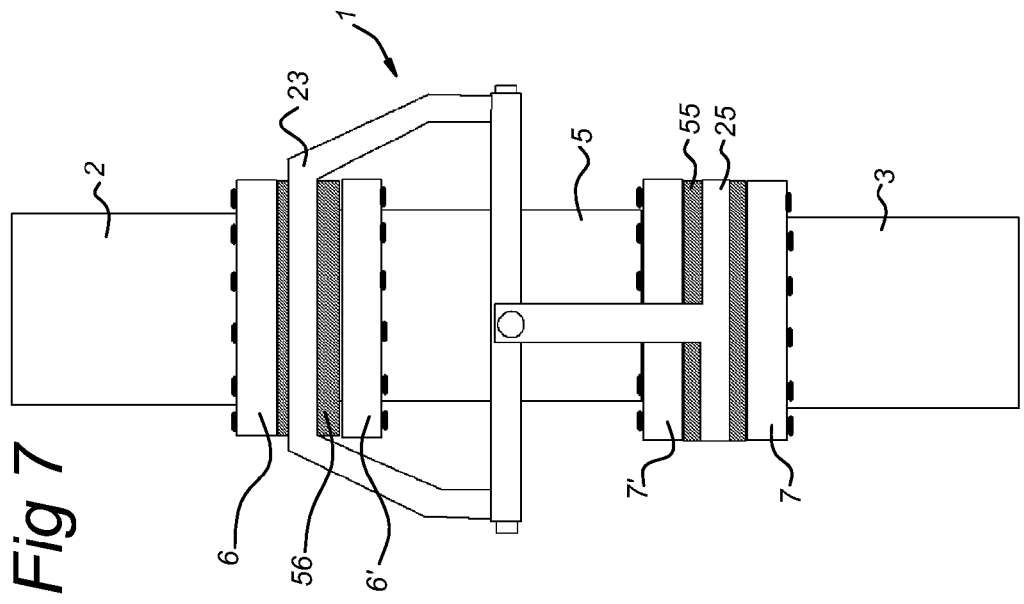
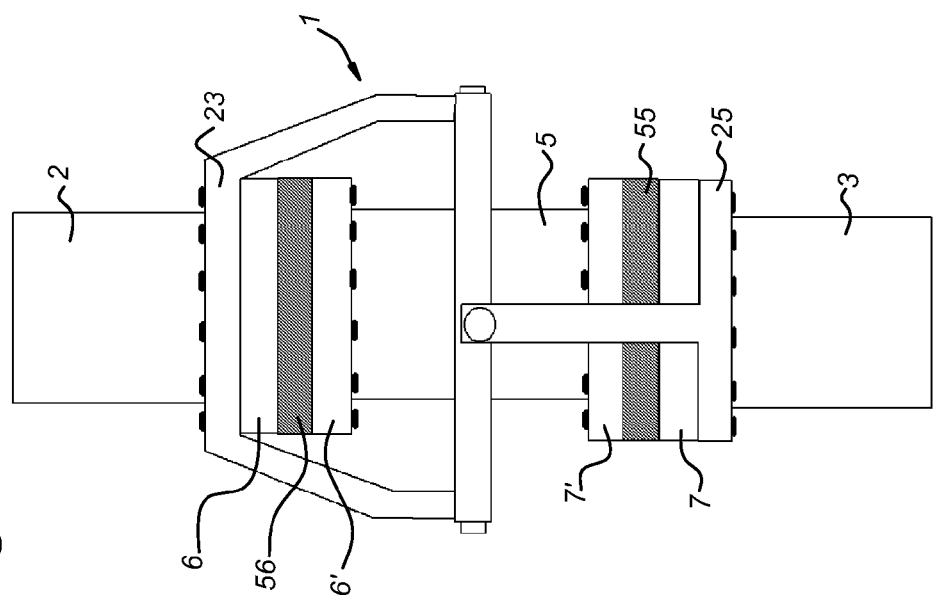

CRYOGENIC GIMBAL COUPLING

This is a 371 National Stage application of international patent application, PCT/EP07/50474, filed Jan. 18, 2007, which claims priority to European application no. 06100598.9, filed Jan. 19, 2006.

BACKGROUND OF THE INVENTION

1. Field of the Invention

The invention relates a coupling structure for cryogenic hydrocarbon transfer pipes, comprising:
- a first and a second cryogenic transfer pipe section each having a metal wall and a flexible pipe section interconnecting the first and second sections,
- a hinging support frame comprising
- a first set of arms connected with a base end to the first pipe section,
- a support ring around the flexible pipe section hingingly attached to hinge end parts of the first set of arms, the first set of arms being pivotable around a first axis, and
- a second set of arms connected with a base end to the second pipe section and with a hinge end part hingingly attached to the support ring, the second set of arms being pivotable around a second axis, which is transverse to the first axis.

2. Description of Related Art

From U.S. Pat. No. 4,097,072 it is known to interconnect rigid conduit sections of an oil transfer pipe by a flexible hose. The flexible hose extends within a cage-shaped cardan joint, the cardan joint transferring the large static and dynamic mechanical loads from one rigid conduit section to the other whilst allowing the conduit sections to pivot with respect to one another around two perpendicular axes. The flexible conduit provides freedom of movement and forms a fluid-tight connection without transferring significant forces.

When transferring cryogenic fluids, such as Liquefied Petroleum Gas (LPG) or Liquefied Natural Gas (LNG), the temperature of the conduit sections can become very low, such as minus 130° C. Special provisions need to be taken for the flexible hose in order to prevent it from becoming brittle and cracking after a few bending cycles. Also the structural members of the cardan, or gimbal couplings will suffer from low temperatures. Especially during start-up and shut down of cryogenic fluid transfer, the temperature differences will cause relatively large local contractions and expansions which may cause the cardan joint to fail due to misalignment of the hinges which can no longer pivot around their axes and hence become jammed. Another adverse effect on the cardan joint caused by the low temperatures is that the hinges could freeze together due to ice formation in the wet offshore environment.

BRIEF SUMMARY OF THE INVENTION

It is therefore an object of the present invention to provide an articulated cryogenic transfer pipe which can be operated at low temperatures in a reliable and fail-safe manner. It is another object of the present invention to provide a cryogenic transfer line which utilises a gimbal coupling and which reduces thermal loads on the pivot points of the coupling.

Hereto the coupling structure of the present invention is characterised in that the base ends of the first and second set of arms are connected to the first and second pipe sections via at least one connector member extending transversely to the respective pipe.

By attaching the supporting arms to the transverse connector member, a mechanically strong connection can be achieved which can take up large forces in an axial direction. Also, by attaching the arms at a distance from the metal wall of the cryogenic pipe sections, an insulating space is formed that prevents the arms, and hence the hinges at the hinge ends of the arms, from becoming too cold.

The connector member can be formed of connecting flanges of the flexible pipe section and the metal first and second pipe sections. An insulating material may be comprised between the flanges.

Alternatively, the connector member is made of an insulating material such as a fibre-reinforced composite material but can also be for instance a steel plate which is relatively thin compared to the length of the arms and the height of the insulating gap. In this way the cross-sectional area for heat transfer from the arms to the pipe sections is small and a good insulating effect of the arms is obtained, while at the same time a sufficiently strong connection of the arms to the metal pipe sections is achieved.

The connector member extends at a predetermined distance from the pipe section metal wall, the arms extending along the respective pipes over a predetermined length such that a gap between the pipe section metal wall and the arm is defined over said length.

The width of the gap between the arms and the respective pipe sections along which the arms extend is between 0.1 and 0.5 times an outer pipe diameter of the cryogenic transfer pipes. The gap can be evacuated but can also comprise an insulating material such as glass fibre reinforced resins, nylon, xytrex, ceramic materials etc. In a preferred embodiment, the arms diverge away from the pipe sections when going from the base end to the hinge end part of the arms. In this way at the same time sufficient insulating distance is created between the arms and the pipe sections, while the support ring can have a relatively large diameter such that bending of the flexible tube can be accommodated without the flexible tube contacting the support ring.

In order to reduce the conductive cross-section between the base end of the arms and the hinge end parts, the arms are of substantially hollow cylindrical shape with a diameter that is between 0.5 times the pipe diameter and 1 times the pipe diameter. With "cylindrical" as is used herein, not only circle cylindrical arms are intended but also arms having a non-circular closed contour cross-section such as rectangular or oval. With "hollow" it is intended that only the walls of the arms are formed by a structurally strong material, whereas the inner space of the arms may be filled up with an insulating material.

The base ends of the arms can be enclosed by an insulating chamber which may be evacuated or filled with an insulating material. The double walled flexible pipe section may comprise an outer pipe attached to an outer pipe of the pipe sections via an outer flange, and an inner pipe which comprises a flexible part and a steel flange part, connected to an inner conduit of the pipe sections via an inner flange, and a ring shaped alignment member enclosing the inner flange and being connected to the outer flange. In this manner the flanges are maintained aligned in an axial and radial position, and can be easily reached for servicing upon dismantling of the outer pipe. A suitable flexible cryogenic double walled hose for use in the present invention is described in European patent application no 05105011.0 which was filed on 8 Jun. 2005 in the name of the applicant, which is incorporated herein by reference.

The flexible coupling according to the present invention can be used in many different positions and configurations, such as at a submerged or surface floating LNG loading/offloading structure, such as a buoy or carrier (e.g. midship loading/offloading) or in a series of articulated joints of hard pipes in a cryogenic mid-water transfer duct.

BRIEF DESCRIPTION OF THE SEVERAL VIEWS OF THE DRAWING(S)

Figure 2:
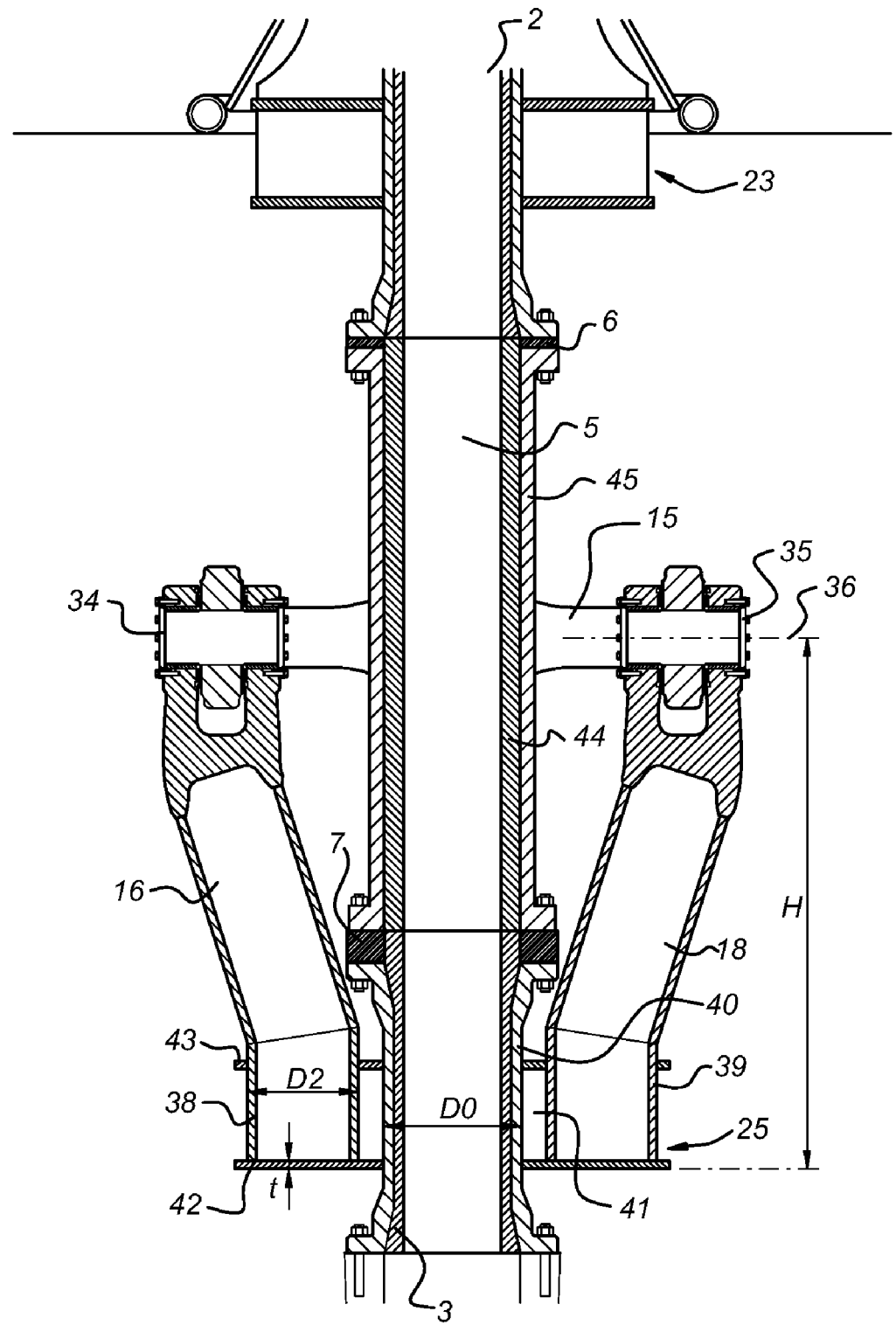
Figure 3:
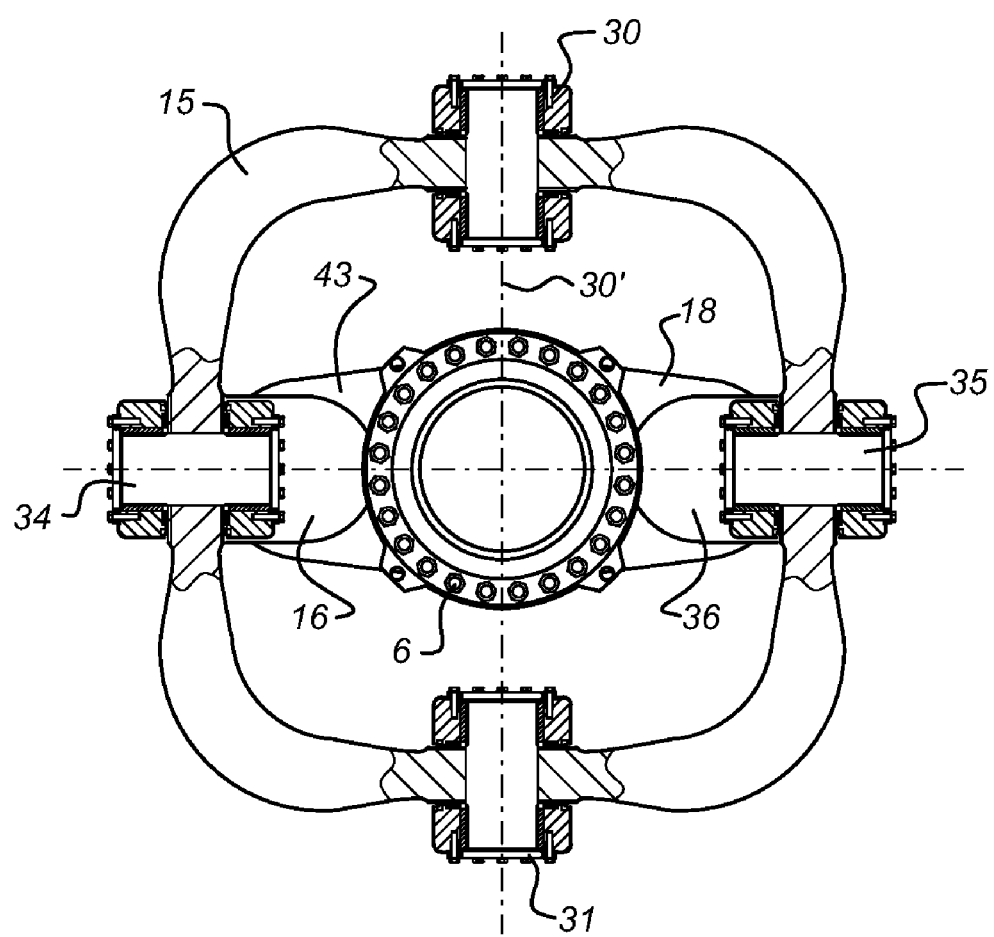
Figure 4:
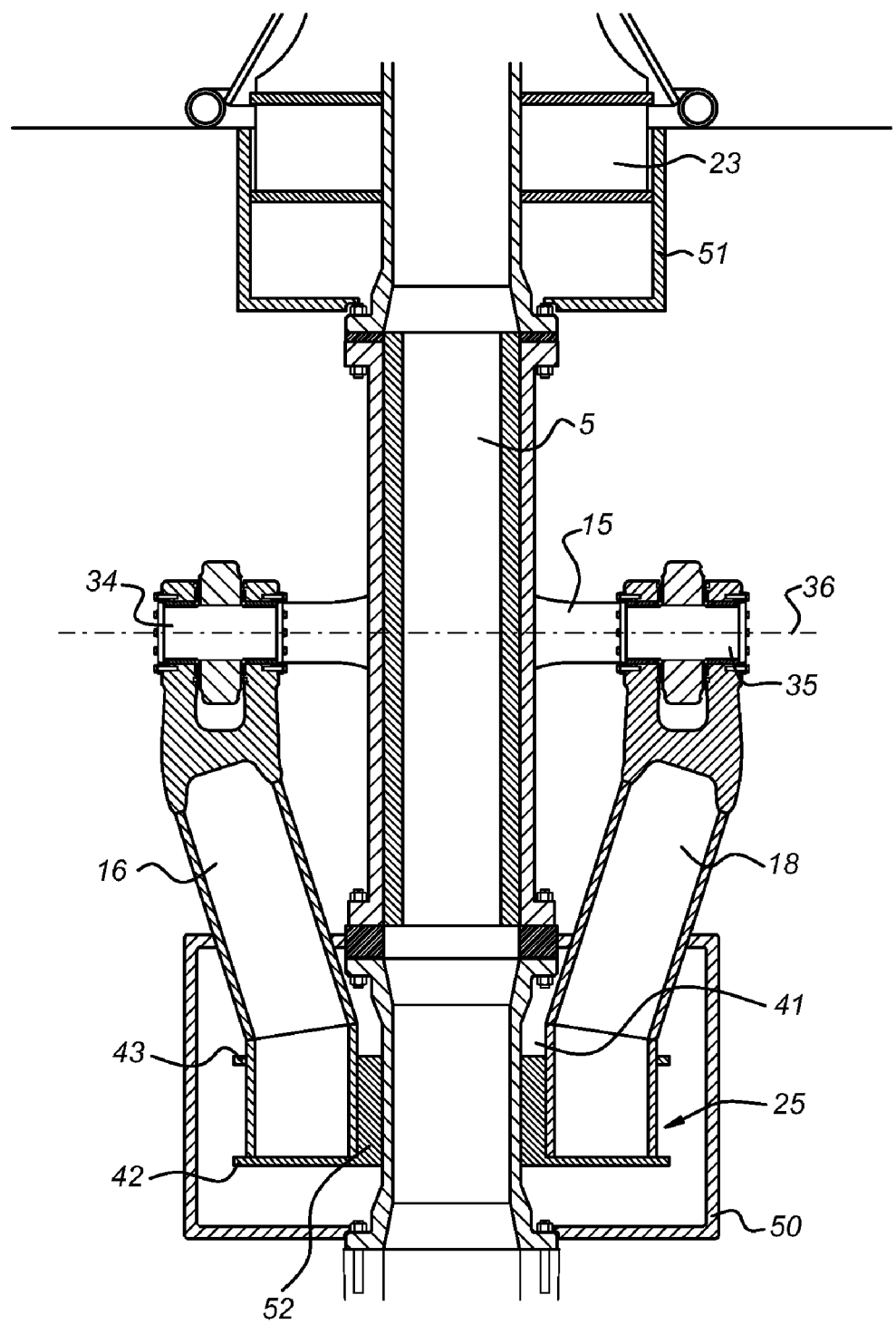
Figure 5:
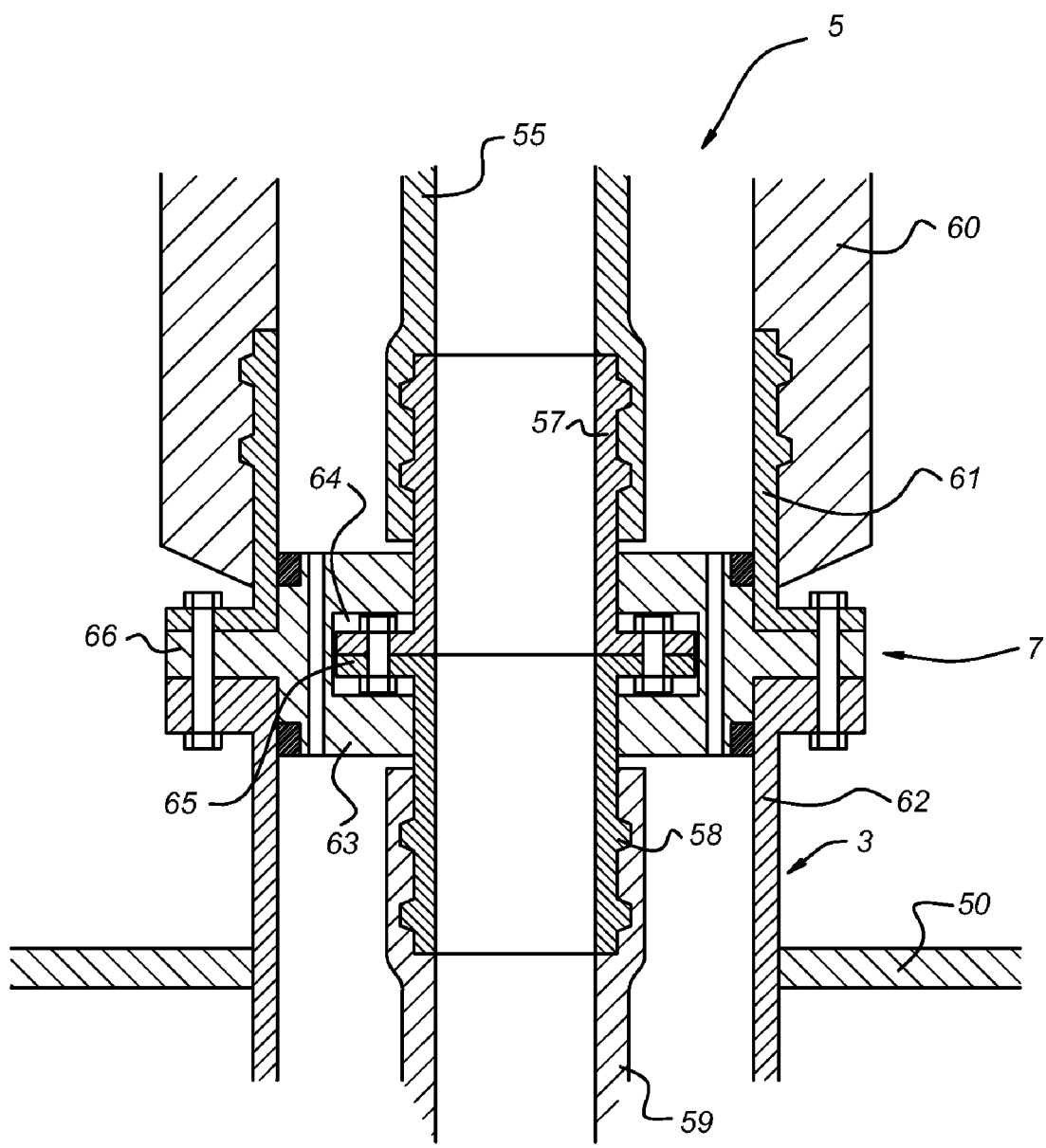

Some embodiments of a coupling according to the present invention will be described in detail with reference to the accompanying drawings. In the drawings:

FIG. 1 shows a perspective view of an embodiment of a cryogenic coupling according to the invention, FIG. 2 shows a longitudinal cross-section of the coupling of FIG. 1, FIG. 3 shows a transverse cross-section of the coupling of FIG. 1, FIG. 4 shows an embodiment of the coupling in which the gap between the arms and the pipe sections is partly filled with insulating material, the base ends being encased in an insulation box, FIG. 5 shows a detail of the double walled cryogenic flexible pipe, and FIG. 6 shows an embodiment wherein the gimbal joint is attached to an outer surface of a coupling flange, FIG. 7 shows an embodiment wherein the gimbal joint is attached between two coupling flanges.

Figure 8:
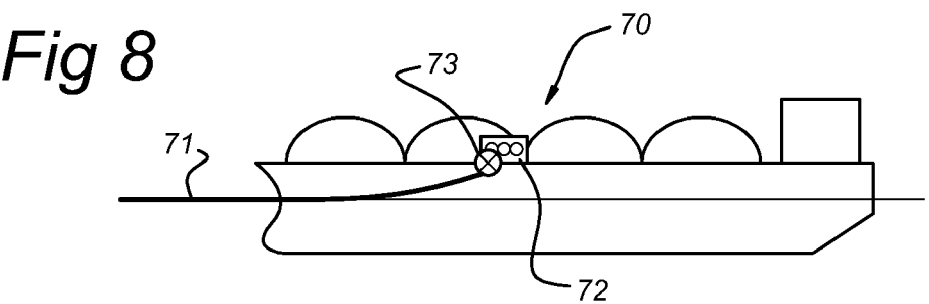
Figure 9:
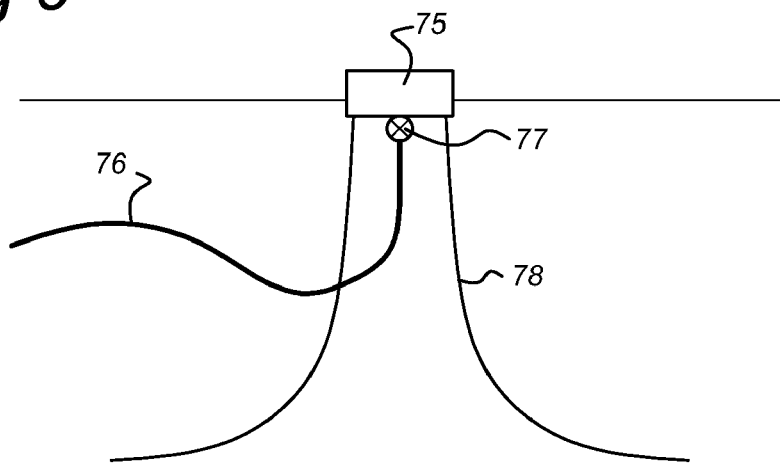
Figure 10:
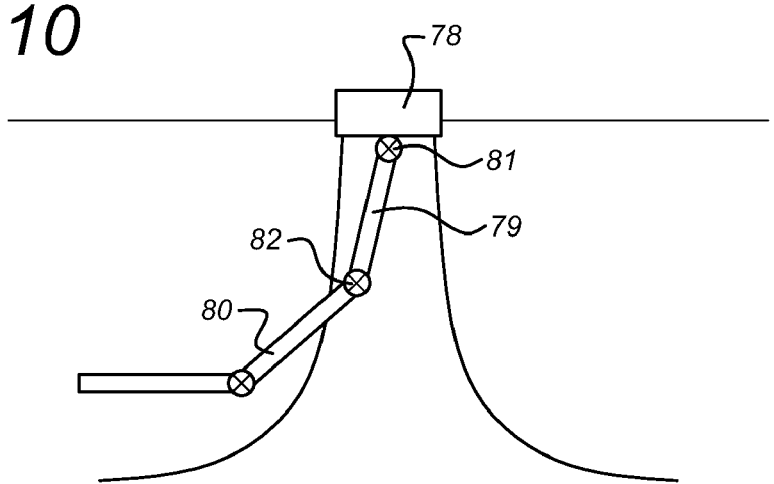

FIGS. 8-10 show schematic representations of different configurations of the coupling of the present invention.

DETAILED DESCRIPTION OF THE INVENTION

FIG. 1 shows the cryogenic coupling structure 1 of the present invention comprising a first pipe section 2 and second pipe section 3. The first and second pipe sections 2,3 are made of relatively rigid material, such as steel, but can be formed of composite materials, and are relatively rigid. An intermediate flexible pipe section 5 interconnects pipe sections 2,3 via coupling flanges 6,7. The pipe sections 2,3 are interconnected via a gimbal joint 9 having first set of arms 11, 13 connecting the pipe section 2 to a support ring 15. A second set of arms 16,18 connects the pipe section 3 to the support ring 15.

The arms 11,13 are at their base ends 20,22 connected to a connector member 23, whereas the arms 16,18 are connected to connector member 25. The hinge ends 27,29 of the first arms 11,13 are attached to the support ring 15 via hinges 30,31 such that the arms can pivot around axis 30'. The end parts 32, 33 of the arms 16,18 are attached to the support ring 15 in hinge points 34,35 to be pivotable around axis 36.

As can be seen from FIG. 2 and FIG. 3, the arms 16,18 are of hollow cylindrical shape, and have upper ends which diverge away from the pipe sections 3,5 in the direction of the hinges 34,35. The base ends 38, 39, are situated at a distance from the metal outer wall 40 of the pipe section 3, such that a gap 41 is formed. The connector member 25 connecting the arms 16,18 to the pipe section 3 is formed by two plates 42,43 which are supported on the pipe section 3 and which enclose the arms 16,18. The thickness t of the plates 42,43 is small compared to the height H of the gap 41, such that only a small cross sectional area for heat transport from the arms 16,18 to the cold outer wall 40 is available.

The flexible pipe section 5 comprises a flexible outer wall 45 and an insulating flexible inner wall 44.

In FIG. 4 the insulation boxes 50,51 around the connector members 23,25 are shown, which boxes can be evacuated or filled with an insulating material. Also the gap 41 is partly filled with an insulating material 52.

FIG. 5 finally shows a double walled flexible pipe section 5 that is connected to a double walled lower piper section 3 via the outer coupling flange 7. The pipe section 5 comprises a flexible inner tube 55 that is connected to a steel flange part 57. This flange part 57 is connected to steel flange part 58 of inner duct 59 of lower pipe section 3. The inner duct 59 can be made of flexible material but can also be comprised of steel, or can be a composite material comprising metal or synthetic fibres, Teflon material and the like. The outer flexible tube 60 is connected via a flange part 61 to the steel outer tube 62 of lower pipe section 3. The flange parts 57,58 are enclosed by a ring-shaped alignment member 63 which has a slot 64 in which the sideways extending members 65 are received in a heat-insulating manner. An outer connecting member 66 of the alignment member 63 is attached to the coupling flanges 7 of the outer pipe 62. In this manner the axial and radial positions of the inner flange member 65 and the outer coupling flange 7 is maintained in a clearly defined state, wherein the inner flange member 65 can be easily reached upon detaching the outer pipe sections 60,62.

FIG. 6 shows an embodiment in which the connector member 23,25 of the coupling structure 1, comprises a ring-shaped elements that is connected to flanges 6,6' and 7,7' interconnecting the flexible pipe section 5 with the first and second pipe sections 2,3. In the embodiment of FIG. 6, an insulating material 55,56 is comprised between the flanges 6 and 6', 7 and 7' to prevent heat transfer from the double walled pipe sections 2,3 to the flexible pipe section 5. The connectors 23 and 25 are mounted on external surfaces of the flanges 6,7. In the embodiment of FIG. 7, the connectors 23,25 are situated between flanges 6,6' and 7,7', enclosed by insulating material 55,56 for prevention of heat transfer from the coupling structure 1 to the flexible pipe section 5.

FIG. 8 shows a tanker for liquefied hydrocarbons, such as LNG tanker 70 which has a floating hose 71 connected to a mid-ship loading-offloading manifold 72. At the end of the hose 71, a coupling structure 73 according to the invention is provided. It is also possible to connect a number of hoses 71 in parallel to a single coupling 73 structure for taking up the large static and dynamic forces.

In the embodiments of for instance FIGS. 6 and 7 it is possible to include an in-line swivel at or near the position of one or both flanges 6, 7. Such in-line swivel or swivels accommodate for swivel forces at the points where the bore is connected to the coupling structure.

In the embodiment of FIG. 9, an LNG loading/offloading buoy at the water surface is attached to a submerged cryogenic mid-water hose 76 (which could be partly floating at the water surface) via a coupling structure 77. The buoy 75 is anchored to the sea bed via anchor lines 78.

In the embodiment of FIG. 10, a number of rigid steel cryogenic pipes 79,80 is supported from a loading/offloading structure, such as a buoy 78. The pipes 79,80 are interconnected via coupling structures 81,82 according to the present invention.

The invention claimed is:
1. A coupling structure for cryogenic hydrocarbon transfer pipes, comprising:
a first cryogenic transfer pipe section and a second cryogenic transfer pipe section, each pipe section having a metal wall;
a flexible pipe section interconnecting the first and second pipe sections; and
a hinging support frame comprising
i) a first set of arms, each arm connected with a base end to the first pipe section, ii) a support ring located around the flexible pipe section and hingingly attached to hinge end parts of the first set of arms, the first set of arms being pivotable around a first axis, and
iii) a second set of arms, each arm connected with a base end to the second pipe section, and each arm having a hinge end part, each arm hingingly attached to the support ring by the hinge end part, the second set of arms being pivotable around a second axis, which second axis is transverse to the first axis, wherein, said first and second set of arms are of substantially hollow cylindrical shape, the base ends of the first set of arms are connected to an first connector member connecting to the first pipe section, the base ends of the second set of arms are connected to a second connector member connecting to the second pipe section, the second connector member comprises a lower plate and an upper plate, the lower and upper plates supported on the second pipe section, the lower and upper plates enclosing the second set of arms, and the second set of arms extend along a section of the second pipe over a length from the lower plate to the upper plate such that an insulating gap is defined between the metal wall of the section of the second pipe and each arm of the second set of arms.

2. Coupling structure according to claim 1, wherein a width of each connector member, in the direction of a gap height, is relatively small compared to the gap height.

3. Coupling structure according to claim 1, wherein a width of the gap is between 0.1 and 0.5 times an outer pipe diameter of the cryogenic transfer pipe sections.

4. Coupling structure according claim 3, wherein an insulating material is provided in said gap.

5. Coupling structure according to claim 1, wherein said arms have a diameter that is between 0.5 times and 1 times a common diameter of the pipes.

6. Coupling structure according to claim 1, wherein said base ends of said arms are enclosed by an insulating chamber.

7. Coupling structure according to claim 1, wherein said arms diverge away from said pipe sections when going from the base end to the hinge end part of the arms.

* * * * *